Jan. 3, 1967  K. REDTENBACHER  3,295,208
APPARATUS FOR DETERMINING THE WORKING LENGTH
OF ROOT CANAL INSTRUMENTS
Filed Nov. 9, 1962  5 Sheets-Sheet 1

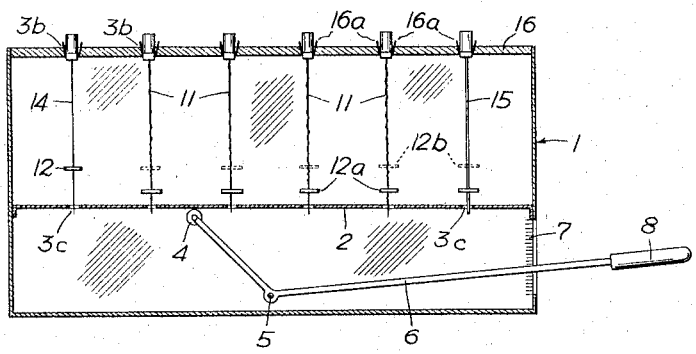
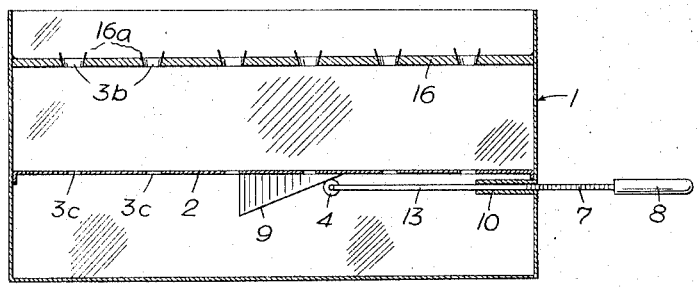
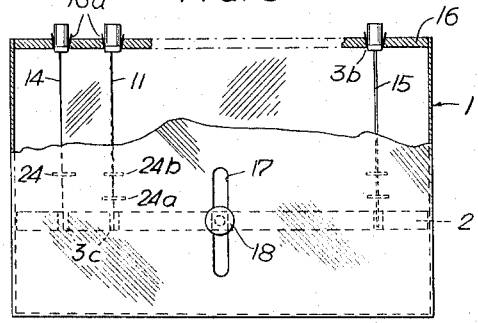

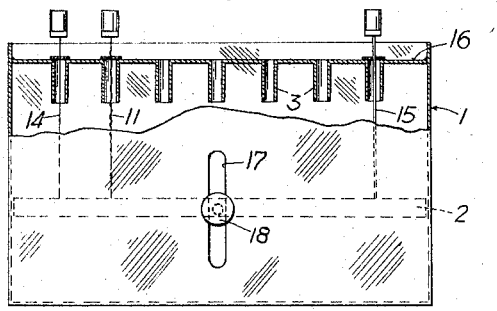
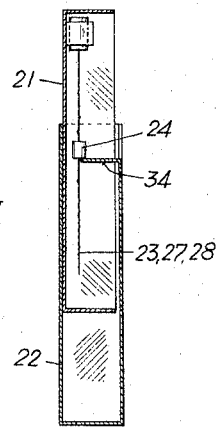
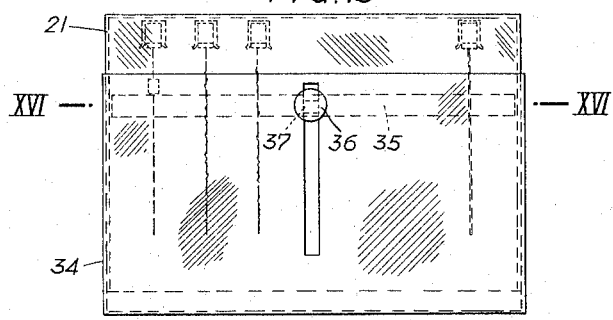
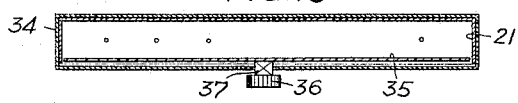
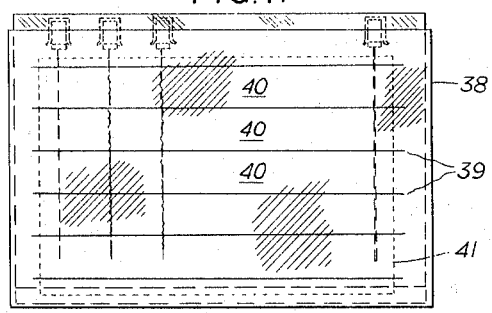

United States Patent Office 3,295,208
Patented Jan. 3, 1967

3,295,208
APPARATUS FOR DETERMINING THE WORKING LENGTH OF ROOT CANAL INSTRUMENTS
Kurt Redtenbacher, 1 Nisselgasse, Vienna, Austria
Filed Nov. 9, 1962, Ser. No. 236,581
Claims priority, application Austria, Nov. 13, 1961,
A 8,565/61
19 Claims. (Cl. 32—40)

This invention relates to apparatus for determining the working length of root canal instruments.

To prepare the root canal of teeth for a root canal treatment and filling, the natural or pathologically changed contents of the root canal must be removed. This is effected by chemical and mechanical methods. The chemical methods involve the use of tissue dissolving agents and the mechanical methods the use of files or needlelike instruments. Because the root canals vary greatly in length, piercing may occur and may result in a transfer of infections material into the jaw bone. To avoid this, the length of the root canal is usually measured with the thinnest canal instrument, particularly under X-ray supervision. The measured length is either read from graduated canal instruments or is adjusted on the instrument introduced first, the measuring probe, by the manual application of a mark or by the fixation of a set screw. The transfer of this length to the other instruments required is effected by means of a measuring operation and by the provision of a mark or the setting of a set screw. This is inaccurate, time-consuming and any set screws employed will interfere with the work. Errors may be involved in the reading of the working length which has been measured and is to be transferred. The provision of set screws on the root canal instruments to be employed is particularly time-consuming because as many as twenty instruments may be required for one tooth.

These disadvantages are avoided according to the invention. The apparatus according to the invention is characterized by a support, provided particularly in the usual instrument package and having mounts for the mutually parallel mounting of two or more root canal instruments, and a device whereby the working length determined by means of a root canal instrument and fixed thereon can be transferred from this instrument to the other instruments mounted on the support. In this way the root canal length, which has been determined once, e.g., by means of the measuring probe, can be transferred in a simple manner to all other instruments required and can be marked on them at the same time, if desired.

The object of the invention may be achieved in practice, e.g., if a plate is arranged which extends parallel to the mounting support and at a variable spacing therefrom. This plate is advantageously mounted in a container, e.g., of parallel-epipedic shape, and is displaceable, e.g., by a push rod acting on the plate by means of an inclined plane, or by a lever arrangement or by an actuating button guided in a slot of the container. Holding elements for mounting the root canal instruments may be provided in supports, particularly platelike supports. If the apparatus is filled with a sterilizing liquid, the adjustable plate has suitably shaped openings or perforations.

A particularly simple design of the apparatus according to the invention will be obtained if a transverse marking device which is displaceable relative to the mounting support in the axial direction of the instruments is provided for the transverse transfer of the working length. The transverse marking device may consist to advantage of a slidable member which is movable relative to the mounting support, e.g., of a hollow body which surrounds the mounting support and the instruments and is formed with a transverse slot, which enables all root canal instruments mounted in the support to be marked by means of a brush in the working length marked on the measuring probe. In this way the working length can be determined on all instruments. The apparatus according to the invention consists suitably of a slide box, the support being connected to the slide tray and the transverse transfer device being connected to the cover.

To effect a transverse marking, marking elements slidably mounted on the instruments may be adjustable by adjusting means provided at the edge of the slot.

The measured value can be transferred in a particularly rapid manner from the measuring probe to the other instruments if the transparent or slotted slide has on that side which faces the instruments a color applicator engageable with the instruments for transverse marking. A fast marking will also be enabled if the slide member consisting, e.g., of a slide box housing, has transverse incisions and the resulting resilient strips have color-delivering inside surface portions. Finally, to effect transverse marking on both sides, the mounting support, e.g., the slide tray, may be open on both sides at least adjacent to the transverse marking devices.

FIG. 5 is a similar view to FIG. 1, but showing a different means for holding the instruments in position in the apparatus;

FIG. 6 is a similar view to FIG. 4, but showing a different means for transferring a measured value from a measuring probe to the other instruments to be placed in the apparatus;

FIGS. 7 and 8 are similar views, partly in elevation, partly in section showing further embodiments of the invention;

FIG. 14 is a cross-sectional view showing an illustrative embodiment of the invention;

FIG. 15 is a view partly in section, partly in elevation of a further embodiment of the invention;

FIG. 16 is a top plan view of the apparatus shown in FIG. 15; and,

FIG. 17 is a view partly in section, partly in elevation of a still further embodiment of the invention.

Figure 1:
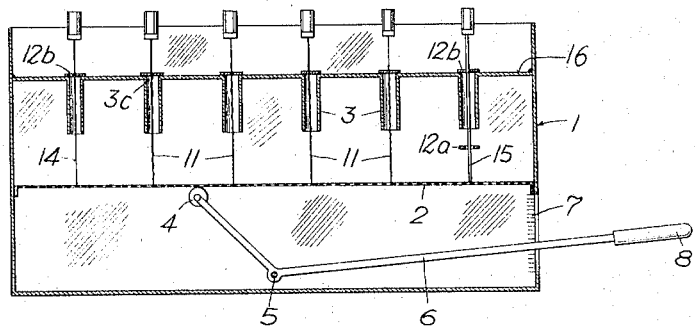
FIG. 1 is a sectional side view of the apparatus showing the means for transferring a measured value from a measuring probe to the other instruments placed in the apparatus.
Figure 3:
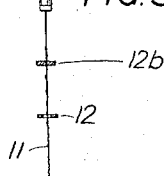
Figure 4:
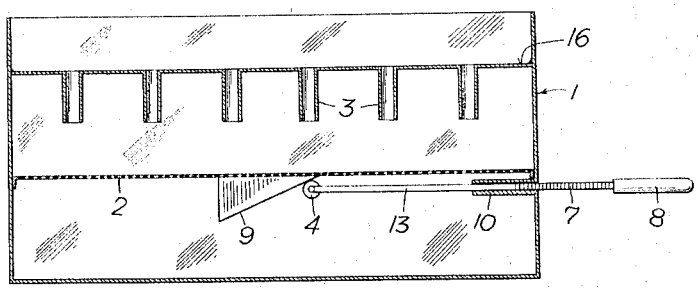
FIG. 4 is a similar view to FIG. 1, but without the instruments, showing a slightly different means for transferring a measured value from a measuring probe to the other instruments to be placed in the apparatus.

The apparatus shown in FIGS. 1 and 4 have a measuring box, which consists of an outer tub or container 1 and a cover or retaining plate 16 closing the top of this tub. This plate 16 has tubular mounts 3 for a parallel mounting of the instruments, which comprise the measuring probe 14, the root canal instruments 11 and the root canal tamper 15. Guide funnels may be provided above the inlet openings 3c of the mounts 3 to facilitate the introduction of the instruments. An adjusting plate 2 is guided in the measuring box and is perforated for immersion into the sterilizing liquid disposed at the bottom of the tub. The perforations are not in registry with the openings 3c of the mounts 3. The adjusting plate 2 is displaceable in a vertical direction and depending on the engagement by the adjusting device carries in FIG. 1 on its underside a slideway for the adjusting ball 4 of the adjusting lever 6 or in FIG. 4 an adjusting wedge 9 for the adjusting slide 13. In the embodiment shown in FIG. 1, the lifting and lowering of the adjusting plate 2 is effected by the adjusting bell crank lever 6 mounted on the pivot 5 and having a handle 8 and the readings can be taken from the measuring scale 7 provided on the tub 1. According to FIG. 4 the adjusting plate 2 is lifted and lowered by inserting or pulling the adjusting slide 13. By means of the adjusting ball 4 and the adjusting wedge 9, this slide causes the lifting and lowering of the adjusting plate 2. The adjusting slide 13 is slidable in the guide 10. The measured values are adjustable on the measuring scale 7 of the adjusting slide 13. It is not essential to obtain a reading of the adjusted value because the setting plate 12 fixed to the measuring probe in position 12b limits the extent to which the measuring probe is introduced into the tub 1. The adjusting plate 2 is now displaced until it engages the tip of the measuring probe while the latter is held in position. Then the remaining instruments are introduced and pushed forward until their tips engage the adjusting plate. During this operation the measuring plates are displaced from position 12a to position 12b. By moving the tips of the instruments into engagement with the adjusting plate 2, the remaining setting plates are automatically adjusted to the level 12b determined at the measuring probe 14 (see FIGS. 1 and 3).

Figure 2:
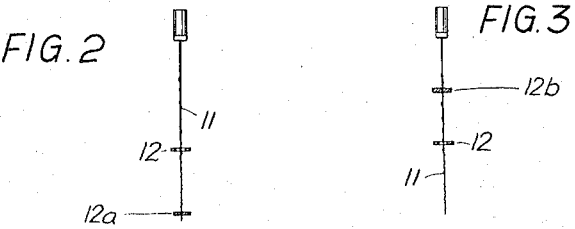
FIGS. 2 and 3 show in elevation instruments provided with measuring plates.

Before the sterilization, the perforated measuring plates 12 are fitted on the root canal instruments 11, 14, 15 close to the tip thereof, as is apparent from FIG. 2. In FIG. 2 the initial position of the measuring plate on the instrument is indicated in FIG. 2 at 12a whereas the position of the measuring plate after the setting of the measured value is indicated at 12b in FIG. 3.

According to FIGS. 5 and 6, the cover or retaining plate 16 has retaining eyes 16a for fixing the instruments in mutually parallel positions. In these embodiments, the adjusting plate 2 is formed with openings 3c, the rims of which displace the measuring plates 12 from position 12a to position 12b, adjusted at the measuring probe, during the lifting of the adjusting plate 2. To enable a supervision of the position of the measuring plates and the adjustment thereof, the box 1 must be transparent or slotted on the side.

According to FIGS. 7 and 8, the adjusting plate 2 is connected to an actuating button 18 or the like, which is guided in a slot 17 of the container. In other respects the design is similar to that of FIG. 1 or 5.

In the embodiment shown in FIGS. 9 to 12, a measuring probe 23 or one of the usual root canal instruments 27a to 27f is provided close to the tip of the instrument with a marking or stop element 24 of any desired material, e.g., a plastic tube, plastic disc, or magnetic metal tube to adhere to the root canal instrument in any position. When the instrument provided with the marking element 24 is introduced into the root canal, the marking or stop element will be pushed into the correct length measuring position. The instrument provided with the adjusted measuring mark 24 is now introduced into the measuring body (instrument container) 21 and is inserted thereby means of the grip head 26 into the preferably resilient mount 25. The marking may now be mechanically or optically transferred.

Figure 9:
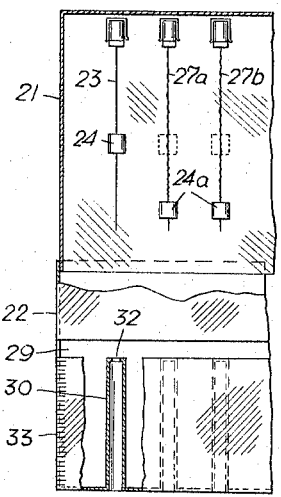
FIGS. 9 and 11 are fragmentary views partly in section, partly in elevation, of other embodiments of the invention.
Figure 11:
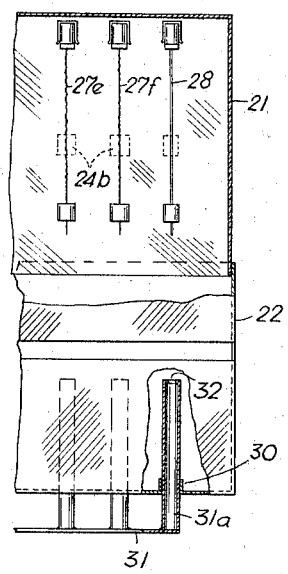
Figure 12:
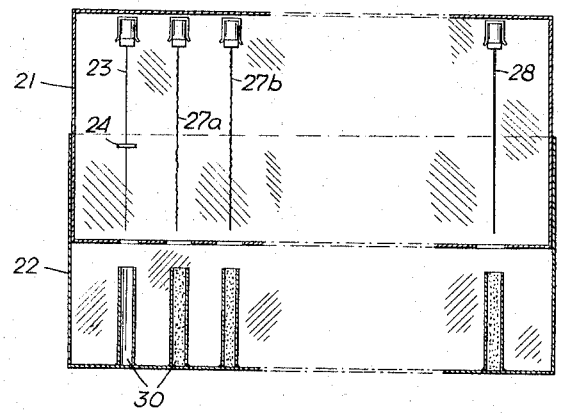
FIG. 12 is a sectional view of a further embodiment which is similar to that of FIGS. 9 to 11.
Figure 10:
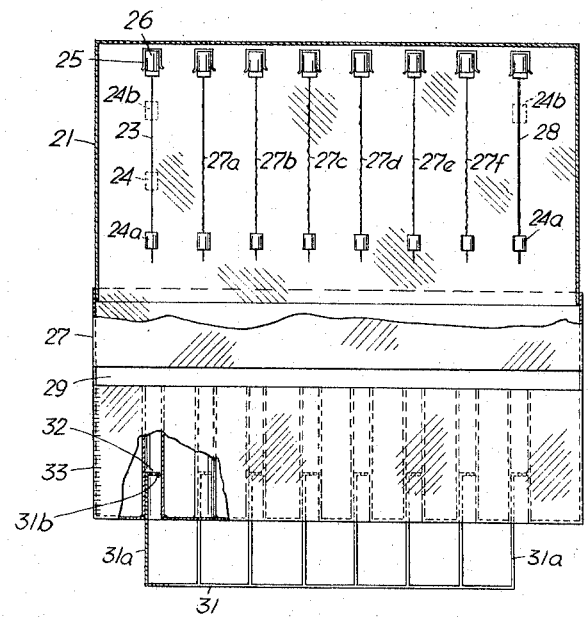
FIG. 10 is a view partly in section, partly in elevation of an embodiment of the invention which is similar to that of FIGS. 9 and 11.

A mechanical transfer may be effected, e.g., according to FIG. 9, in that the measuring elements fitted to the root canal instruments, inclusive of the root canal tamper 28, close to the tip thereof are moved into the measuring position by tubular openings 30 in the adjusting body 22 when the matchboxlike parts 21 and 22 are pushed together. This will cause the tips of the instruments to enter the openings 32 of the tubes 30. According to FIGS. 10 and 11 this operation may be reversed if adjusting elements 31a are pushed into tubular openings 30 or the like. For this purpose, an adjusting base or frame 31 carrying a row of elements 31a is provided, which acts at the same time on all root canal instruments provided with a stop. In these embodiments the transfer of the measured value on the remaining root canal instruments is not effected by pushing the slidable parts 21 and 22 into each other but by pushing the adjusting base or frame 31 into the closed container 21, 22. The adjusting elements 31a of the adjusting base or frame 31 consist suitably of tubes (FIG. 11). According to FIG. 10, they may alternatively consist of plates 31b secured to rods 31a of the base or frame 31 and each plate having a central opening 32 for the passage of the tip of the instrument. During their introduction into the adjusting body 22, the tubes or plates displace the marking elements 24 of the root canal instruments to be used from position 24a into the measured position, e.g., 24b.

The marking may be visually effected either by coloring that portion of the instruments which is to be introduced or by decolorizing an instrument previously provided with a marking color which is medically ineffective or has a sterilizing activity, such as Pyoctamin. According to FIG. 12 this may be effected by a coloring or decolorizing means contained in the tubular openings 30. To enable a supervision, the lower portion of the housing 22 is transparent or is provided with a window at the scale 33.

Figure 13:
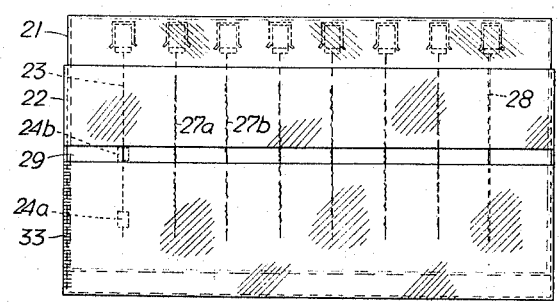
FIG. 13 is a view partly in section, partly in elevation of a still further embodiment of the invention.

According to FIG. 13, marking is preferably effected by fixing in the instrument container 21 the measuring instrument 23, on which the measuring element has been moved from position 24a to position 24b when the instrument 23 was introduced into the root canal. The parts 21 and 22 of the matchboxlike measuring apparatus are then pushed together. The inward sliding movement of the adjusting body 22 relative to the measuring body 21 will be terminated when the marking slot 29 of the adjusting body 22 registers with the marking body 24b. By means of a brush and a suitable coloring agent, such as chloropercha, all instruments are simultaneously marked in the correct position 24b, which has been ascertained by clinical and X-ray methods.

FIG. 14 is a sectional view showing an illustrative embodiment in which all instruments have displaceable marking elements 24. When the parts 21 and 22 are pushed together, the inturned edge 34 or the like will displace the marking elements 24 of all instruments until they are on the level of the set marking element of the measuring probe.

FIGS. 15 and 16 show another slideboxlike apparatus according to the invention. The transparent outer housing 34 has an internal color applicator 35, which is urged by means of a button 36 against the instruments. By means of a connecting element 37 guided in the slot of the housing, this button is connected to the color applicator. This connecting element is preferably rectangular in cross-section or has another configuration affording side faces so that a good guidance at the edges of the slot results and the color applicator will always remain in the transverse position and can be displaced only parallel to itself. A helical compression spring may be provided between the button 36 and the outside surface of the housing 34 and may tend to return the color applicator to its position of rest. Alternatively, the body of the color applicator may consist of a curved leaf spring having an inwardly facing concave side.

The transverse marking may be effected according to FIG. 17, in which a slidebox housing 38 has transverse incisions 39. The resulting resilient strips 40 have color-delivering inside surface portions. Different strips may carry different colors. Slots or transparent housing surfaces may be provided between the color-delivering surface portions to permit of an inspection.

The invention is not restricted to the examples shown.

Essential are only a support for a parallel mounting of the instruments and means for a transverse transfer of the working length, particularly in the usual instrument package with a transverse marking. The instruments of the embodiments shown in FIGS. 5, 6 and 8 to 17 are of equal length.

According to the invention measured lengths of root canals are transferred to root canal treating instruments so that they can easily be ascertained on the instrument by the dentist either by reading or by touching, and a piercing of the apical root canal opening by the instrument is prevented visually or be the engagement of a stop on the entrance to the root or the perforation in the crown of the tooth.

What I claim is:

1. Apparatus for determining the working length of the root canal instruments having a longitudinal axis, said apparatus comprising a container containing a retaining support, at least two root canal instruments retained on said support in mutually parallel positions, marking elements axially adjustably mounted on said instruments, a transferring means for transversely transferring a working length set on one of said instruments mounted in said support to at least one other of said instruments mounted in said support, said support being rigidly attached to said container and said transfer means being slidably mounted in said container, said transferring means comprising a plate extending parallel to and adjustably spaced from said retaining support, displacing means for displacing said plate in the container, said support having mounting and adjusting openings therein adapted to receive said instruments in mutually parallel positions, said mounting and adjusting openings being adapted to receive one of said root canal instruments each and being smaller in at least one dimension of their cross-section than the corresponding dimension of said marking elements.

2. Apparatus for determining the working length of root canal instruments having a longitudinal axis, said apparatus comprising a container containing a support for retaining at least two root canal instruments in mutual parallel positions, a transferring means for transversely transferring a working length set on one of said instruments mounted in said support to at least one other of said instruments mounted in said support, said support being rigidly attached to said container, said transferring means being slidably mounted in said container, said transferring means comprising a slidable member mounted for adjustment relative to said support in the direction of the longitudinal axes of the instruments mounted in said support in mutually parallel positions, and further including a slide box consisting of a slide tray connected to said support and a cover connected to said transferring means.

3. Apparatus as set forth in claim 2, in which said slide tray is open on both sides at least adjacent to said transferring means to permit of the use of said transferring means from both sides.

4. Apparatus for determining the working length of root canal instruments having a longitudinal axis, said apparatus comprising a container containing a support retaining at least two root canal instruments in mutual parallel positions, a transferring means for transversely transferring a working length set on one of said instruments mounted in said support to at least one other of said instruments mounted in said support, said support being rigidly attached to said container, said transferring means being slidably mounted in said container, said transferring means comprising a slidable member mounted for adjustment relative to said support in the direction of the longitudinal axes of the instruments mounted in said support in mutually parallel positions, and said slideable member comprising a hollow body enclosing said support and said instruments.

5. Apparatus as set forth in claim 4, in which said hollow body is formed with a transverse slot.

6. Apparatus as set forth in claim 4, in which said hollow body comprises a slidable base having adjusting elements projecting therefrom in a direction towards the instruments.

7. Apparatus as set forth in claim 5, and further including marking elements axially adjustably mounted on said instruments, adjusting means disposed at the edge of said slot and arranged to adjust said marking elements axially and said adjusting means being operable in response to a movement of said slidable member relative to said support.

8. Apparatus as set forth in claim 7, in which said marking elements comprise magnetic metal tubes fitted on said instruments.

9. Apparatus as set forth in claim 7, in which said adjusting means includes a base having projections extending therefrom for cooperation with said marking elements.

10. Apparatus for determining the working length of root canal instruments having a longitudinal axis, said apparatus comprising a container containing a support for retaining at least two root canal instruments in mutual parallel positions, a transferring means for transversely transferring a working length set on one of said instruments mounted in said support to at least one other of said instruments mounted in said support, said support being rigidly attached to said container, said transferring means being slidably mounted in said container, said transferring means comprising a slidable member mounted for adjustment relative to said support in the direction of the longitudinal axes of the instruments mounted in said support in mutually parallel positions, said slidable member is at least partly transparent and is provided on its side facing the instruments with a color applicator, and said applicator being engageable with the instruments to apply color to them for transverse marking.

11. Apparatus as set forth in claim 10, in which said slidable member consists of transparent material.

12. Apparatus for determining the working length of root canal instruments having a longitudinal axis, said apparatus comprising a container containing a support for retaining at least two root canal instruments in mutual parallel positions, a transferring means for transversely transferring a working length set on one of said instruments mounted in said support to at least one other of said instruments mounted in said support, said support being rigidly attached to said container, said transferring means being slidably mounted in said container, said transferring means comprising a slidable member mounted for adjustment relative to said support in the direction of the longitudinal axes of the instruments mounted in said support in mutually parallel positions, said slidable member is at least partly slotted and is provided on its side facing the instruments with a color applicator, and said applicator being engageable with the instruments to apply color to them for transverse marking.

13. Apparatus for determining the working length of root canal instruments having a longitudinal axis, said apparatus comprising a container containing a support for retaining at least two root canal instruments in mutual parallel positions, a transferring means for transversely transferring a working length set on one of said instruments mounted in said support to at least one other of said instruments mounted in said support, said support being rigidly attached to said container, said transferring means being slidably mounted in said container, said transferring means comprising a slidable member mounted for adjustment relative to said support in the direction of the longitudinal axes of the instruments mounted in said support in mutually parallel positions, said slidable member having transverse incisions therein defining resilient strips, and said strips having color-delivering inside surface portions.

14. Apparatus for determining the working length of root canal instruments having a longitudinal axis, said apparatus comprising a container containing a support for retaining at least two root canal instruments in mutual parallel positions, a transferring means for transversely transferring a working length set on one of said instruments mounted in said support to at least one other of said instruments mounted in said support, said support being rigidly attached to said container, said transferring means being slidably mounted in said container, said transferring means comprising a slidable member mounted for adjustment relative to said support in the direction of the longitudinal axes of the instruments mounted in said support in mutually parallel positions, and further including a slide box comprising a slidable tray connected to said support and a cover formed by said slidable member.

15. Apparatus for determining the working length of root canal instruments having a longitudinal axis, said apparatus comprising a container containing a support for retaining at least two root canal instruments in mutual parallel positions, a transferring means for transversely transferring a working length set on one of said instruments mounted in said support to at least one other of said instruments mounted in said support, said support being rigidly attached to said container, said transferring means being slidably mounted in said container, said transferring means comprising a plate etxending parallel to and adjustably spaced from said retaining support, displacing means for displacing said plate in the container, said retaining support having mounting openings therein adapted to receive said instruments in mutually parallel positions and said plate having openings laterally offset from said mounting openings.

16. Apparatus as set forth in claim 15, in which said retaining support includes tubes defining said mounting openings.

17. Apparatus for determining the working length of root canal instruments having a longitudinal axis, said apparatus comprising a container containing a support for retaining at least two root canal instruments in mutual parallel positions, a transferring means for transversely transferring a working length set on one of said instruments mounted in said support to at least one other of said instruments mounted in said support, said support being rigidly attached to said container, said transferring means being slidably mounted in said container, said transferring means comprising a plate extending parallel to and adjustably spaced from said retaining support, displacing means for displacing said plate in the container, said displacing means comprising a push rod axially slidably mounted in said container and extending out of said container and a member having a planar surface inclined relative to said plate and to said push rod and engageable by the latter, and said planar surface member being fixed to said plate.

18. Apparatus for determining the working length of root canal instruments having a longitudinal axis, said apparatus comprising a container containing a support for retaining at least two root canal instruments in mutual parallel positions, a transferring means for transversely transferring a working length set on one of said instruments mounted in said support to at least one other of said instruments mounted in said support, said support being rigidly attached to said container, said transferring means being slidably mounted in said container, said transferring means comprising a plate extending parallel to and adjustably spaced from said retaining support, displacing means for displacing said plate in the container, and said displacing means comprising a lever arrangement relatively movably mounted in and extending out of said contatiner and engaging said plate.

19. Apparatus for determining the working length of root canal instruments having a longitudinal axis, said apparatus comprising a container containing a support retaining at least two root canal instruments in mutual parallel positions, a transferring means for transversely transferring a working length set on one of said instruments mounted in said support to at least one other of said instruments mounted in said support, said support being rigidly attached to said container, said transferring means being slidably mounted in said container, said transferring means comprising a plate extending parallel to and adjustably spaced from said retaining support, displacing means for displacing said plate in the container, marking elements axially adjustably mounted on said instruments, said support having mounting openings therein adapted to receive said instruments in mutually parallel positions and said plate having adjusting openings axially aligned with said mounting openings and adapted to receive one of said root canal instruments each and being smaller in at least one dimension in the plane of said plate than the corresponding dimension of said marking elements so that a movement of said plate relative to said instruments received in said mounting openings and in a direction toward said support will cause said instruments to be received by said adjusting openings and said marking elements to be engaged and axially displaced relative to said instruments by said plate around said adjusting openings.

References Cited by the Examiner

UNITED STATES PATENTS

| 1,187,566 | 6/1916 | Taylor | 206—17 |
| 1,933,538 | 11/1933 | Brazelton | 132—79 |
| 2,667,394 | 1/1954 | Goetz et al. | 206—66 X |
| 2,798,520 | 7/1957 | Maskulka | 145—129 |

RICHARD A. GAUDET, *Primary Examiner.*

ROBERT E. MORGAN, *Examiner.*

J. W. HINEY, JR., *Assistant Examiner.*